April 28, 1942.  S. W. MARTIN  2,281,197
RUNNING GEAR CHECKING APPARATUS
Original Filed Dec. 31, 1935   2 Sheets-Sheet 1
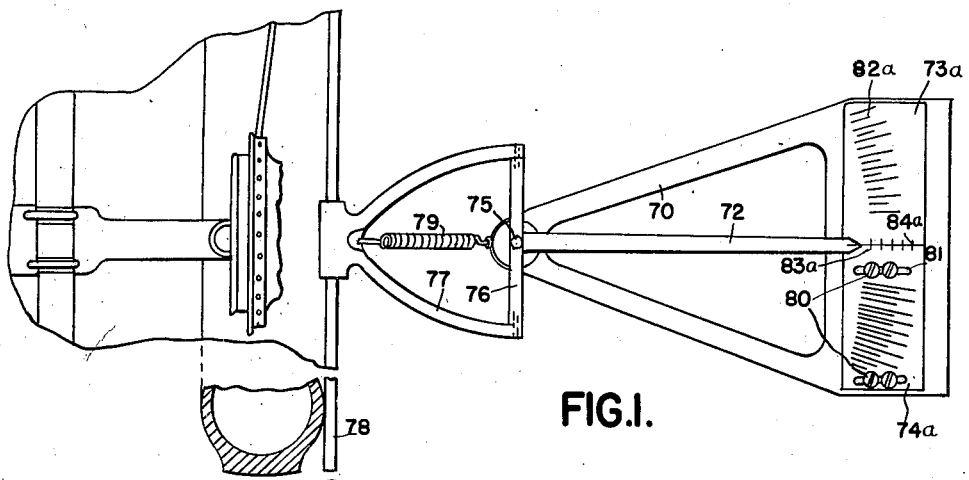
FIG.1.
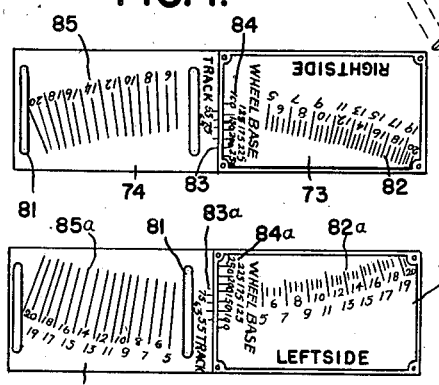
FIG.4.
FIG.2.
FIG.5.
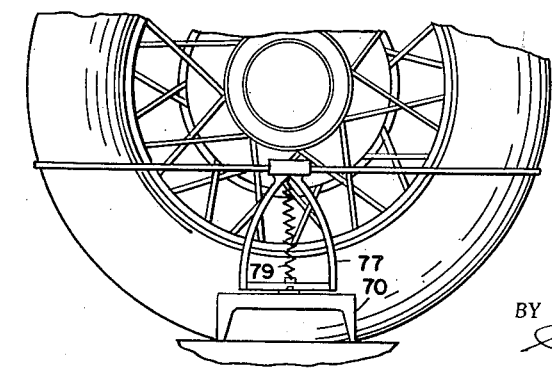
FIG.3.
INVENTOR.
SIDNEY W. MARTIN
BY
ATTORNEYS April 28, 1942.　　　S. W. MARTIN　　　2,281,197
RUNNING GEAR CHECKING APPARATUS
Original Filed Dec. 31, 1935　　2 Sheets-Sheet 2
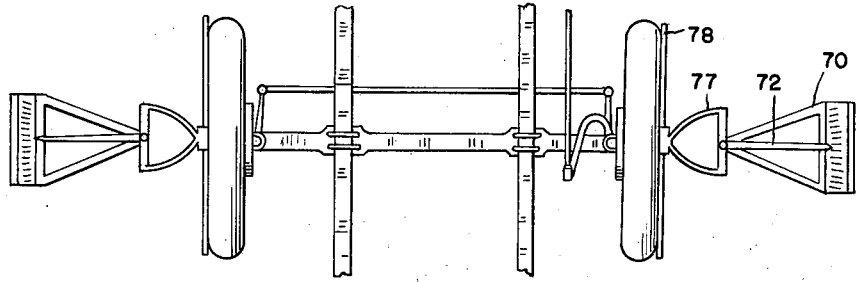
FIG.6.
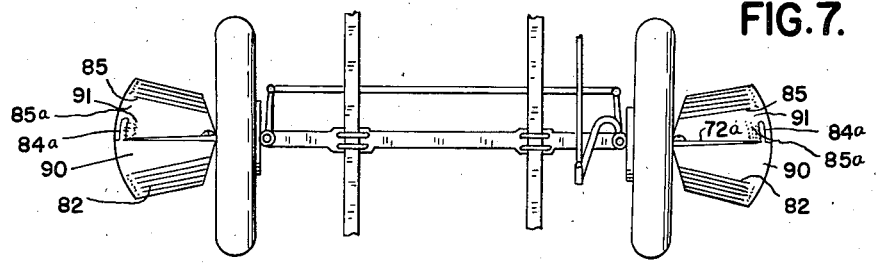
FIG.7.
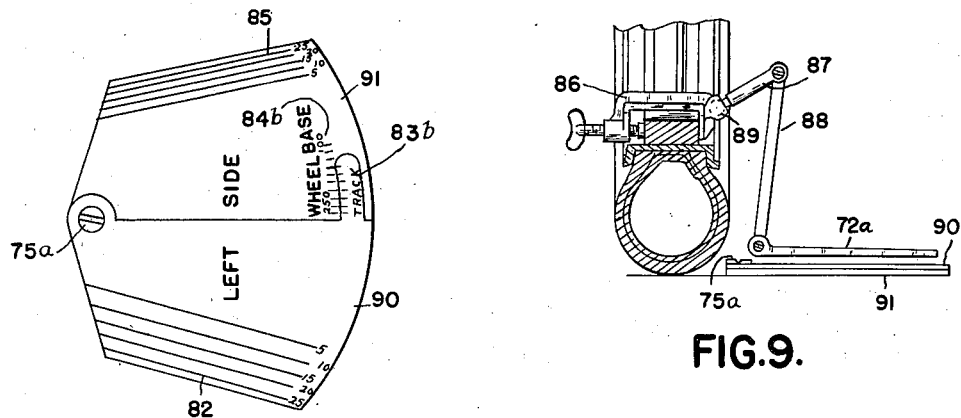
FIG.8.
FIG.9.
INVENTOR.
SIDNEY W. MARTIN
BY
ATTORNEYS Patented Apr. 28, 1942

2,281,197

UNITED STATES PATENT OFFICE 2,281,197

RUNNING GEAR CHECKING APPARATUS

Sidney W. Martin, Chicago, Ill.

Original application December 31, 1935, Serial No. 56,972. Divided and this application October 28, 1939, Serial No. 301,851

13 Claims. (Cl. 33—203)

This invention relates to testing devices for checking the alignment of the wheels, running gear, and steering mechanism of automobiles and other vehicles.

The present application is a division of my copending application Serial No. 56,972, filed December 31, 1935, for "Running gear checking and correcting apparatus," which has now matured into Patent No. 2,177,669, issued October 31, 1939.

An important object of the invention is the provision of means whereby the steering geometry and alignment of the supporting portions of the steerable wheels of a vehicle may be checked, and any inaccuracies and their extent determined.

A further object is the provision of means for simultaneously checking the steering radius of both front wheels, and determining any inaccuracies in the relationship thereof, and the extent of such inaccuracies.

Other objects and advantages will be apparent from the following description, wherein reference is made to the accompanying drawings illustrating preferred embodiments of my invention, and wherein similar reference numerals designate similar parts throughout the several views.

In the drawings:

Figure 1 is a plan view of an improved checking device for determining inaccuracies of turning radius of a wheel, showing the adjacent supporting portions of a motorcar, in conjunction with which the device is adapted to be used.

Figure 2 is a side view of the instrument.

Figure 3 is an end view thereof, fragmentarily showing a wheel in elevation.

Figures 4 and 5 are plan views of the indicator plates or scales used upon the checking device.

Figure 6 is a plan view of a front axle and wheel assembly showing two complementary checking devices of this type as used, one upon each front wheel of an automobile, to check both wheels simultaneously.

Figure 7 is a view similar to Figure 6 showing a somewhat modified form of the invention.

Figure 8 is an enlarged plan view of the adjustable scale portions used in the modified embodiment.

Figure 9 is a fragmentary sectional view of the front wheel of a motorcar, showing in side elevation one of the instruments of the embodiment of Figure 7.

Referring now to the drawings: my preferred mechanism for checking the accuracy and determining the extent of any incorrectness of the angular movement of the wheels during steering, as shown in Figures 1 to 6, inclusive, comprises a frame or base 70 having short legs, as 71, adapted to support it beside the front wheels of the car under test, upon the floor or other surface upon which the latter is standing. Pivoted upon the nose of the triangular base 70, as upon a pin 75, is a pointer 72 arranged to sweep a scale formed in cooperating sections carried by separate plates 73—74. The scale plates are mounted upon the broader rear end of the base, and one, as 74, is slidable relatively to the other toward and from the pivot bolt 75, being shown adjustably secured to the base 70 by means of screws 80 passing through slots 81 in the plate.

Also swingably movable with the needle 72 and pivoted about the bolt 75 is a transverse bar 76 to which is pivoted on a horizontal axis a swinging frame 77, which carries at its end a transverse wheel-engaging rod 78 adapted to extend across and contact the outer side wall of a tire at two points, as best shown in Figure 3, when the device is positioned beside the wheel and the rod leaned thereagainst. A tension spring, as 79, may also be provided to assist in urging the rod against the wheel, stretched between the nose of the base 71 and the top of the swinging frame 77.

Preferably a pair of these instruments are used simultaneously, one against each front wheel, in the manner best shown in Figure 6, in checking the turning geometry of the car, and the opposing instruments of the pair are similarly constructed, but oppositely calibrated. The reversed arrangement and calibration of the indicator plates used on right and left side instruments is clearly brought out in Figures 4 and 5 respectively. One of the scale or dial plates on each instrument, as 73—73a, may have its scale portion (82—82a) calibrated in degrees of turning radius, while the other dial plate of each, as 74—74a, may be so calibrated, as at 85—85a, that when in use during a checking operation, and the equivalent needle on the opposite instrument of the pair designates any given number of degrees of turning radius of its front wheel (on the scale 82 or 82a) the needle 72 will indicate on the scale 74, or 74a, a line having the same numerical value, if the wheels are correctly adjusted.

In initial setting of the instrument, the screws 81 are loosened and the plate 74 is moved to align the track calibrations 83 and wheelbase calibrations 84 in such manner that the figures representing the track and the wheelbase of the car under test register with one another. The indicia are disposed in such manner that correction is thereby provided for variations in the track and wheelbase of cars.

In the somewhat modified construction shown in Figures 7, 8 and 9, the body of the chart or scale portion of the indicator is formed in two sectoral plate sections 90—91 pivoted together as by the pivot bolt 75a to permit their angular adjustment relatively to each other. The plates 90—91 are adapted to rest flat upon the floor and are provided with overlapping scale portions 83b—84b, calibrated in tread and wheel base respectively, for adjusting the instrument to cars of different dimensions in a manner analogous to the scale adjustment provided in the embodiment last described by the movability of plate 74. Along the edges of the plates 90—91 are ruled a plurality of parallel lines, calibrated on one plate in degrees of turning radius and on the other calibrated to indicate the same numerical value when with the scale plates properly adjusted and the wheels properly aligned, the opposite wheel is turned to any given angle. The sections 82b are calibrated in degrees and the sections 82b are calibrated arbitrarily to agree numerically when the relationship between the wheel is correct, these sections being disposed oppositely on the units for the two wheels, as shown in Figure 7.

In this embodiment the pointer 72a is directly attached to the wheel, as by means of the clamp 86 and articulated arms 87—88, the former attached to the clamp 86 by a ball and socket joint 89, and the latter pivotally attached to the pointer, which is thereby held spacedly above the scale portions carried by the plates, for free swinging thereover upon turning the wheels about their steering axes. It will be seen that in order to initially position the apparatus it is only necessary to set the wheels straight ahead and so arrange the plate assemblies 90—91 on the floor beside the opposite wheels to be tested, and so connect the points thereto that the latter indicate zero with the wheels in that position. The plates are of course preliminarily adjusted for the track and wheelbase of the car. Thereafter, upon swinging the wheels in either direction, the numerical values indicated by opposite points should be equal, and if they are not, the extent of the inaccuracy is of course indicated by the extent to which they vary.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. In a wheel gauging device, an arcuate scale portion adapted to rest upon a horizontal support, a pointer adapted to sweep said scale, and means for connecting said pointer to the wheel of a vehicle standing upon a horizontal support upon which said scale portion is resting whereby it may be swept over said scale by turning the wheel with respect to a substantially vertical axis.

2. In a wheel gauging device, a frame adapted to rest upon a horizontal support, an arcuate scale portion carried by said frame, a pointer pivoted in the frame on a substantially vertical axis and adapted to sweep said scale, means for connecting said pointer to the wheel of a vehicle standing upon a support upon which said scale portion is resting for turning movement with the wheel when the latter is turned about a substantially vertical axis, and means for moving at least a portion of said scale toward and from the pivotal axis of said pointer.

3. In a gauging device for the steerable wheels of a vheicle, a frame, a substantially horizontal arcuate scale portion carried by the frame, a pointer adapted to sweep the scale, means for connecting the pointer to a wheel of a vehicle whereby upon swinging the wheel about a substantially vertical axis the pointer may be moved over the scale, and means adjustably securing at least a portion of the scale to the frame for movement toward and from the wheel.

4. In a gauging device for the steerable wheels of a vehicle, a frame, a substantially horizontal arcuate scale portion carried by the frame, a pointer adapted to sweep the scale, and means for connecting the pointer to a wheel of a vehicle.

5. A gauging device for a wheel steerable about a substantially vertical axis comprising a frame, a substantially horizontal scale portion having indicia thereon disposed substantially radially with respect to the steering axis of a wheel to be tested, a pointer, means for connecting said pointer to a wheel to be tested whereby it may be made to sweep the scale when the wheel is swung about the steering axis, and means for adjusting the initial position of at least a portion of said scale with respect to the pointer.

6. Means for testing the relative movement of the steerable wheels of a vehicle about their steering axes, comprising in combination with an indicator adapted to be moved by each of the wheels as they are swung about such axes, whereby both such indicators may be swung at once with steering movement of the wheels, two scale means for cooperation with each of said indicators, including a right scale for use when the wheel is swung to the right of the straight ahead position, and a left scale for use when the wheel is swung to the left of such position, the corresponding scales for the opposite wheels being so calibrated that the right scale of one wheel and the left scale of the other give corresponding readings when the movement of the wheels is uniform.

7. Means for testing the relative movement of the steerable wheels of a vehicle about their steering axes, comprising in combination with an indicator adapted to be moved by each of the wheels as they are swung about such axes, whereby both such indicators may be swung at once with steering movement of the wheels, two scale means for cooperation with each of said indicators, including a right scale for use when the wheel is swung to the right of the straight ahead position, and a left scale for use when the wheel is swung to the left of such position, the corresponding scales for the opposite wheels being so calibrated that the right scale of one wheel and the left scale of the other give corresponding readings when the movement of the wheels is uniform, a support for positioning said right and left scales of each pair with relation to each other, one of said scales being adjustable with relation to the other, and means for determining the setting of said scale means with relation to each other to compensate for differences in the dimensions of vehicles under test.

8. Means as set forth in claim 6 including a support for positioning said right and left scales of each pair with relation to each other, one of said scales being movable with relation to the other, said indicators including a movable element cooperatively mounted to swing with relation to said scale means, and means for connecting said indicators to the wheels to swing therewith.

9. Means as set forth in claim 6 including a support for positioning said right and left scales of each pair with relation to each other, one of said scales being movable with relation to the other, said indicators including a movable element carried by each support, and driving means for said element also carried by the support and engageable with the wheel to drive said element in response to movement of the wheel.

10. Means as set forth in claim 6 including a support for positioning said right and left scales of each pair with relation to each other, one of said scales being movable with relation to the other, said indicators including a movable element carried by each support, and driving means for said element also carried by the support and engageable with the wheel to drive said element in response to movement of the wheel, comprising a transverse rod adapted to bear against the wheel and movable to and from the same with respect to the support but connected to the indicator to actuate the same.

11. Means as set forth in claim 7 in which said adjustable scale is movable toward and from the wheel.

12. A device for measuring the turning angles of vehicle dirigible wheels comprising, in combination, a base plate, and an upright structure for contacting the side of a vehicle road wheel including a part pivotally secured to said base plate for turning movement about a vertical axis, a second part comprising a pair of spaced arms pivotally connected to said first part for turning movement about a common horizontal axis, a rod of a length to contact diametrically opposite points on the side of a vehicle road wheel, and means on the ends of said arms for supporting said rod in substantially horizontal position, said rod adapted to be swung toward and away from the side of a vehicle road wheel by the pivotal movement of said arms about said horizontal axis.

13. A device for measuring the turning angles of vehicle dirigible wheels comprising, in combination, a base plate, a member pivotally secured to said base plate for movement about a vertical axis, means for indicating the amount of turning of said member relative to said base plate, a U-shaped structure having the arms thereof pivotally secured to said member about a horizontal axis and arranged for swinging movement about said horizontal axis toward and away from the side of a wheel being tested, the closed end of said U-shaped structure being shaped to receive a rod, and a rod carried by the closed end of said U-shaped structure and being of a length to contact diametrically opposite points on the side of a tire secured to the wheel of the vehicle being tested.

SIDNEY W. MARTIN.